United States Patent
Lai et al.

(10) Patent No.: US 8,936,314 B2
(45) Date of Patent: Jan. 20, 2015

(54) MULTI-PURPOSE SEAT FOR A CHILD

(71) Applicants: Ching-Chi Lai, Taichung (TW); Tang-Jen Lai, Taichung (TW)

(72) Inventors: Ching-Chi Lai, Taichung (TW); Tang-Jen Lai, Taichung (TW)

( * ) Notice: Subject to any disclaimer, the term of this patent is extended or adjusted under 35 U.S.C. 154(b) by 160 days.

(21) Appl. No.: 13/719,178

(22) Filed: Dec. 18, 2012

(65) Prior Publication Data
US 2014/0167462 A1 Jun. 19, 2014

(51) Int. Cl.
| | |
|---|---|
| A47C 1/08 | (2006.01) |
| B60N 2/26 | (2006.01) |
| A47D 1/10 | (2006.01) |
| A47D 13/02 | (2006.01) |
| B60N 2/28 | (2006.01) |

(52) U.S. Cl.
CPC ...... *B60N 2/265* (2013.01); *A47D 1/10* (2013.01); *A47D 13/025* (2013.01); *B60N 2/2806* (2013.01); *B60N 2/2812* (2013.01); *B60N 2/2842* (2013.01)
USPC ........ 297/254; 297/250.1; 297/485; 297/487; 224/158; 224/159

(58) Field of Classification Search
CPC ................................ B60N 2/265; B60N 2/286
USPC .............. 297/4, 17, 183.1, 183.6, 250.1, 253, 297/254, 256.15; 224/158, 159, 160, 161
See application file for complete search history.

(56) References Cited

U.S. PATENT DOCUMENTS

| | | | | |
|---|---|---|---|---|
| 4,324,430 | A * | 4/1982 | Dimas et al. | 297/256.17 |
| 5,265,931 | A * | 11/1993 | Ryan | 297/130 |
| 6,692,072 | B2 * | 2/2004 | Nelson et al. | 297/250.1 |
| 7,438,356 | B2 * | 10/2008 | Howman et al. | 297/180.11 |
| 7,571,961 | B2 * | 8/2009 | Gold et al. | 297/255 |
| 8,403,413 | B2 * | 3/2013 | Scott | 297/250.1 |
| 2004/0026971 | A1 * | 2/2004 | McClellan-Derrickson | 297/250.1 |

* cited by examiner

*Primary Examiner* — David R Dunn
*Assistant Examiner* — Jody Giacoman

(57) ABSTRACT

A multi-purpose seat for a child includes a seat body, a protecting sheet, a shoulder strap and an encircle belt. The seat body has two upper straps respectively defined on two sides of the seat body. The protecting sheet has two upper buckles which are connected with the two upper straps respectively. The protecting sheet has two through holes for passing through two legs of a child respectively. Two ends of the shoulder strap are assembled on a rear side of the seat body and two ends of the encircle belt are assembled to the shoulder strap. Under this arrangement, a user carries the child sitting on the seat body by the shoulder strap; besides, the seat body is fixed on a car seat and the encircle belt is encircled the car seat, so that the child sits on the seat body securely.

4 Claims, 6 Drawing Sheets

MULTI-PURPOSE SEAT FOR A CHILD

BACKGROUND OF THE INVENTION

1. Field of the Invention

The present invention relates to a seat for a child and more particularly to a multi-purpose seat for a child.

2. Description of Related Art

Child seats and infant carriers are convenient for people to carry their children everywhere. When people go shopping or go traveling with their children, these apparatuses help people to carry their children conveniently and safely. According to the purpose, people could choose a suitable apparatus to carry their children.

A conventional seat for a child has a seat body and a plurality of retaining straps that hold the child on the seat. The conventional seat for a child is mounted on a car seat. However, the conventional seat for a child has two disadvantages as following. Firstly, because the conventional seat is large and heavy, it is hard to move easily. Secondly, when a user wants carry their children outside, the conventional seat is inconvenient to use because it is mounted on the car seat.

The present invention has arisen to mitigate and/or obviate the disadvantages of the conventional seat.

SUMMARY OF THE INVENTION

The main objective of the present invention is to provide an improved seat for children.

To achieve the objective, a multi-purpose seat for a child comprises a seat body, a protecting sheet, a shoulder strap and an encircle belt, the seat body having a seating area defined therein, the seat body having two upper straps respectively defined on two sides of the seat body, one end of the protecting sheet assembled to a lower portion of the seating area, the protecting sheet having two upper buckles defined at an upper portion thereof; the two upper buckles connected with the two upper straps respectively, the protecting sheet having two through holes defined at a lower portion thereof for passing through two legs of a child respectively and two ends of the shoulder strap assembled on a rear side of the seat body respectively, two ends of the encircle belt assembled to the two ends of the shoulder strap respectively. Wherein the seat body has two bottom buckles defined at a bottom end thereof; a retaining belt is encircled a bottom end of the car seat longitudinally; two ends of the retaining belt are buckled with the two bottom buckles respectively; the seat body has at least one bottom buckles defined at the bottom end thereof; the shoulder strap has two assisting buckles defined at two ends thereof respectively; a supporting strap which is Y-shaped has a branch portion and a lower portion; two ends of the branch portion of the supporting strap are connected to the assisting buckles; the lower portion of the supporting strap is connected to the bottom buckle, so that the supporting strap is located out of the protecting sheet for securely positioning the protecting sheet; a seat cushion is sleeved onto the seat body and is located in the seat area; the seat cushion has a position strap assembled on two ends of the seat cushion; the position strap of the seat cushion is encircled an upper portion of the seat body; the seat body has a back panel, a seat panel and two side panels; the seat panel is connected with a bottom end of the back panel; the two side panels are located on two sides of the seat body respectively and are connected with the back panel and the seat panel; the two upper straps are mounted on the two side panels respectively; the two ends of the shoulder strap are assembled on the rear side of the back panel respectively.

Under this arrangement, a user carries the child sitting on the seat body by the shoulder strap with the encircle belt encircled the user's body; besides, when the seat body is fixed on a car seat, the encircle belt is encircled and fixed on a seat back of the car seat, so that the child sits on the seat body securely.

Further benefits and advantages of the present invention will become apparent after a careful reading of the detailed description with appropriate reference to the accompanying drawings.

DETAILED DESCRIPTION OF THE INVENTION

Figure 1:
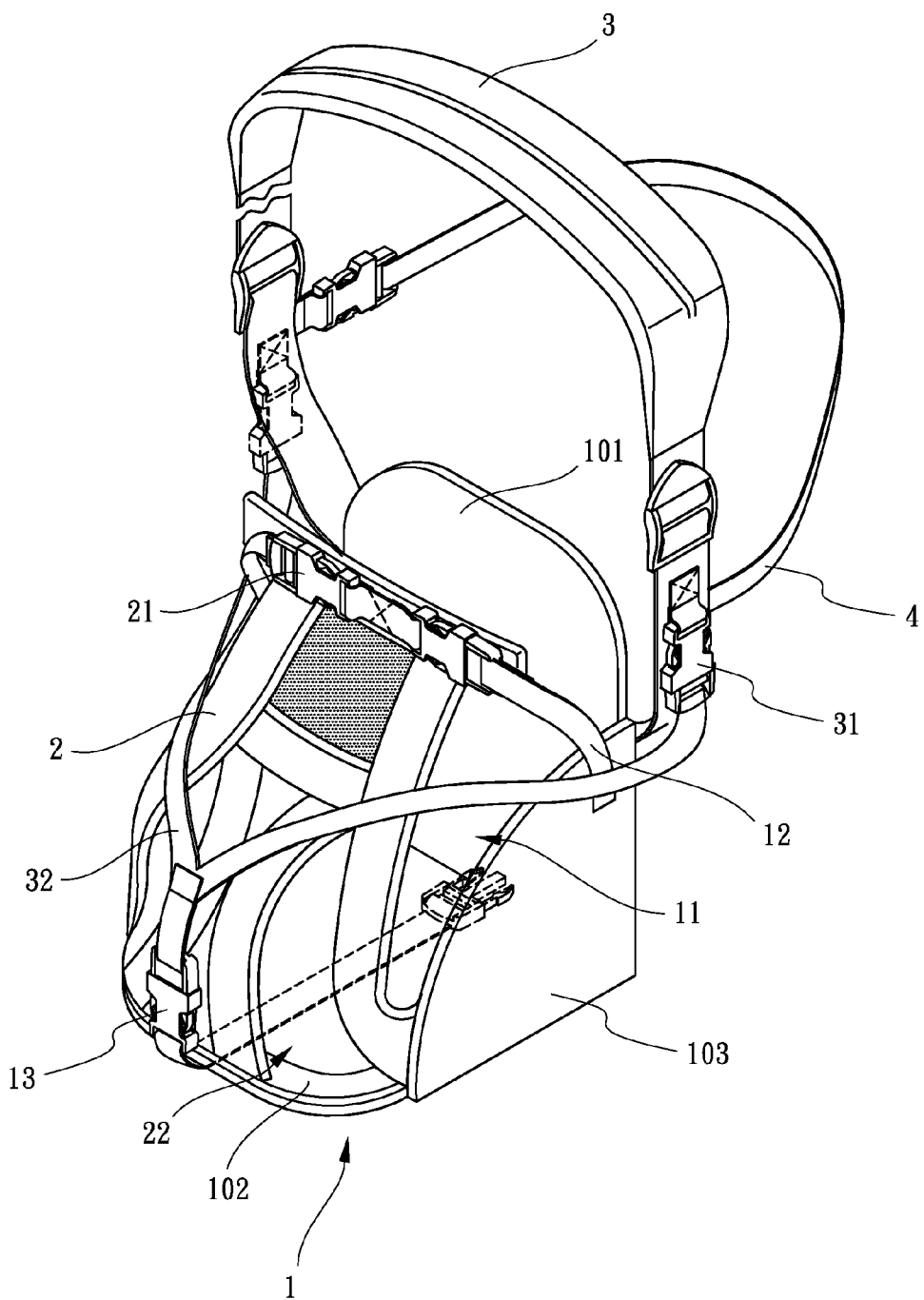
FIG. 1 is a perspective view of a multi-purpose seat for a child of the present invention.
Figure 2:
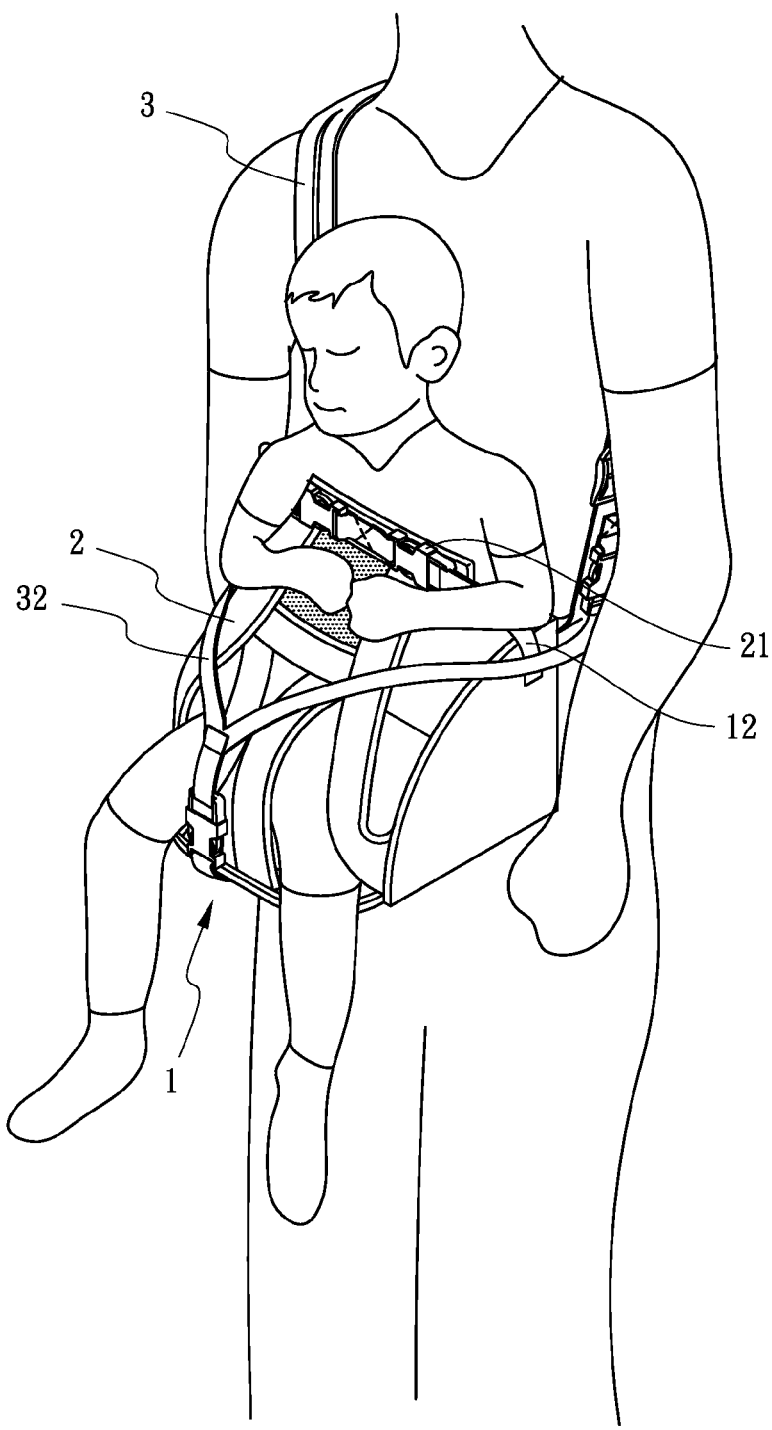
FIG. 2 is a schematic view of the present invention for showing a child seats on the multi-purpose and is carried by a user at the front side.
Figure 3:
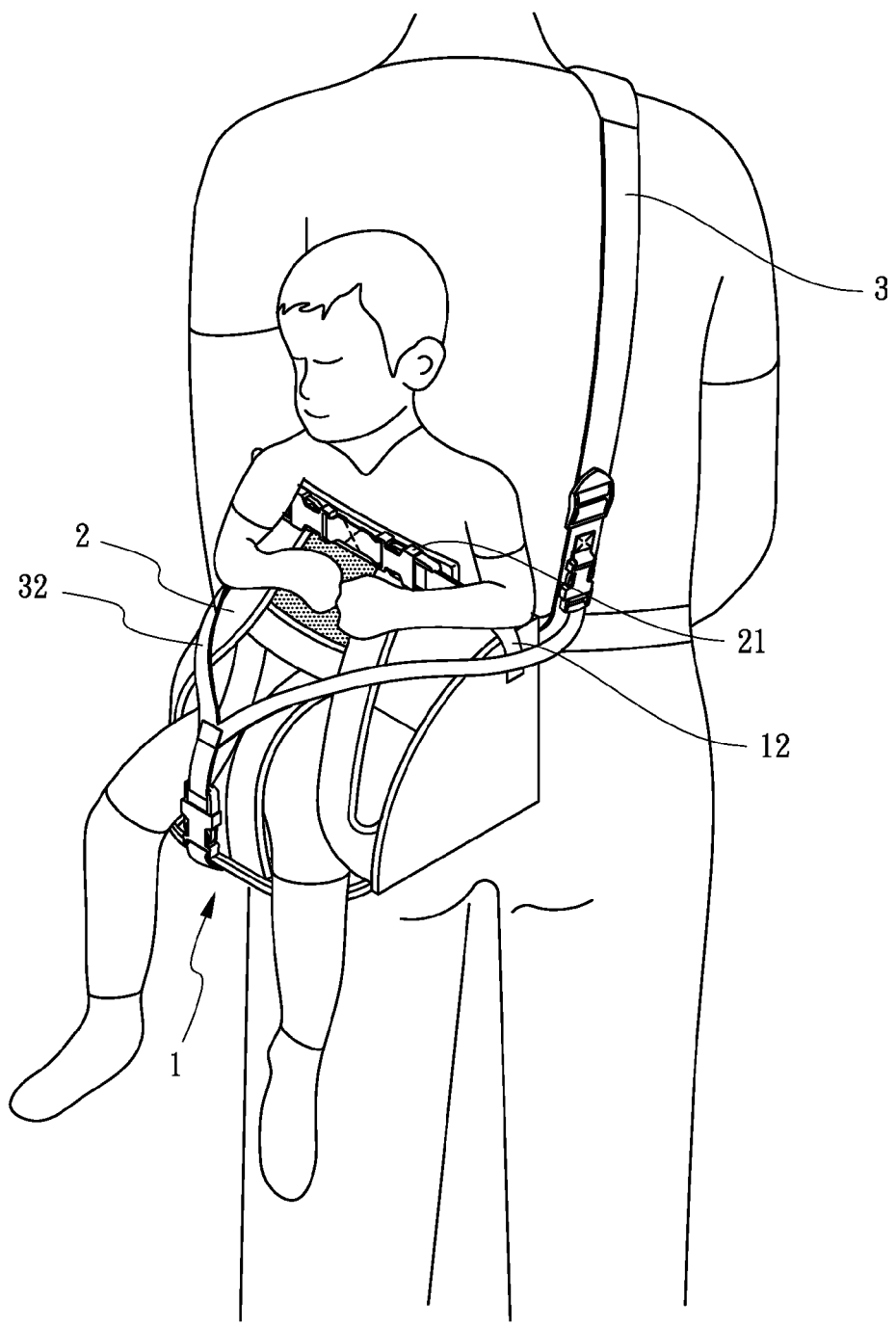
FIG. 3 is another schematic view of the present invention for showing the child seats on the multi-purpose seat and is carried by the user at the rear side.
Figure 4:
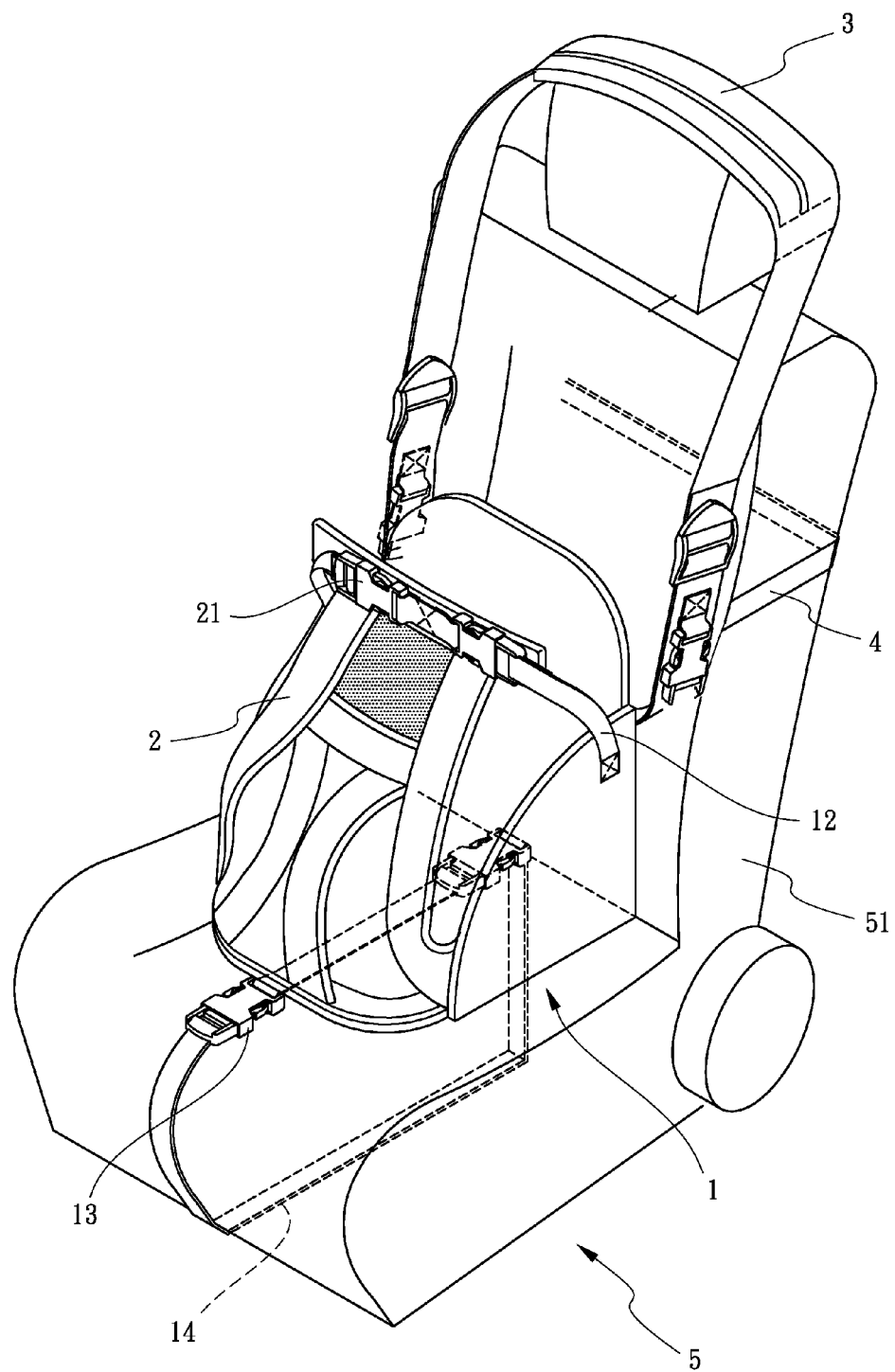
FIG. 4 is a schematic view for showing the multi-purpose seat for a child of the present invention is mounted on a car seat.

Referring to FIGS. 1-4, a multi-purpose seat for a child in accordance with the present invention comprises a seat body 1, a protecting sheet 2, a shoulder strap 3 and an encircle belt 4.

The seat body 1 has a seating area 11 defined therein. The seat body 1 has two upper straps 12 respectively defined on two sides of the seat body 1. One end of the protecting sheet 2 is assembled to a lower portion of the seating area 11. The protecting sheet 2 has two upper buckles 21 defined at an upper portion thereof. The two upper buckles 21 are connected with the two upper straps 12 respectively. The protecting sheet 2 has two through holes 22 defined at a lower portion thereof for passing through two legs of a child respectively.

Two ends of the shoulder strap 3 are assembled on a rear side of the seat body 1 respectively. Two ends of the encircle belt 4 are assembled to the two ends of the shoulder strap 3 respectively.

Under this arrangement, a user carries the child sitting on the seat body 1 by the shoulder strap 3 with the encircle belt 4 encircled the user's body; besides, when the seat body 1 is fixed on a car seat 5, the encircle belt 4 is encircled and fixed on a seat back 51 of the car seat 5, so that the child sits on the seat body 1 securely.

Operations of the present invention are further elucidated as following.

In a first condition, the multi-purpose seat of the present invention is carried by the user. Firstly, the user helps the child to sit in the seating area 11 of the seat body 1 and the two legs of the child are passed through the two through holes 22 respectively; and then, the upper straps 12 are passed through the armpits of the child and are buckled into the upper buckles 21, so that the protecting sheet 2 is located at a front side of the child's body. Secondly, the user shoulders the shoulder trap 3 with the encircle belt 4 encircled the user's body, wherein the seat body 1 is located in front of the user or behind the user. Therefore, the user carries the child by the shoulder strap 3.

In the second condition, the multi-seat of the present invention is assembled on the car seat 5. Firstly, the user helps the child to sit in the seating area 11 of the seat body 1; and then, the upper straps 12 are passed through the armpits of the child and are buckled into the upper buckles 21, so that the protecting sheet 2 is located at the front side of the child's body. Secondly, the seat body 1 is positioned on the car seat 5 and the encircle belt 4 is encircled the seat back 51 of the car seat 5 horizontally, so that the child sits on the seat body 1 securely.

Furthermore, when the multi-purpose seat of the present invention is unused, the upper straps 12 are unbuckled from the upper buckles 21, so that the child could be directly hold away from the seat area 11 which is between the protecting sheet 2 and the seat body 1.

All in all, the user uses the multi-seat of the present invention to shoulder the child and position on the car seat 5. In addition, the seat body 1, the protecting sheet 2, the shoulder strap 3 and the encircle belt 4 are made of cloth materials, so that the present invention is lighter than the conventional seat and the volume of present invention is smaller than the conventional seat.

The further details of the present invention are shown as following:

1. The seat body 1 has two bottom buckles 13 defined at a bottom end thereof. A retaining belt 14 is encircled a bottom end of the car seat 5 longitudinally. Two ends of the retaining belt 14 are buckled with the two bottom buckles 13 respectively, so that the seat body 1 is assembled on the car seat 5 securely.

2. The seat body 1 has at least one bottom buckles 13 defined at the bottom end thereof. The shoulder strap 3 has two assisting buckles 31 defined at two ends thereof respectively. A supporting strap 32 which is Y-shaped has a branch portion and a lower portion. Two ends of the branch portion of the supporting strap 32 are connected to the assisting buckles 31. The lower portion of the supporting strap 32 is connected to one of the bottom buckles 13, so that the supporting strap 32 is located out of the protecting sheet 2 for securely positioning the protecting sheet 2. Therefore, the supporting strap 32 provides an additional protection when the child sits on the seat body 1 of the present invention.

Figure 5:
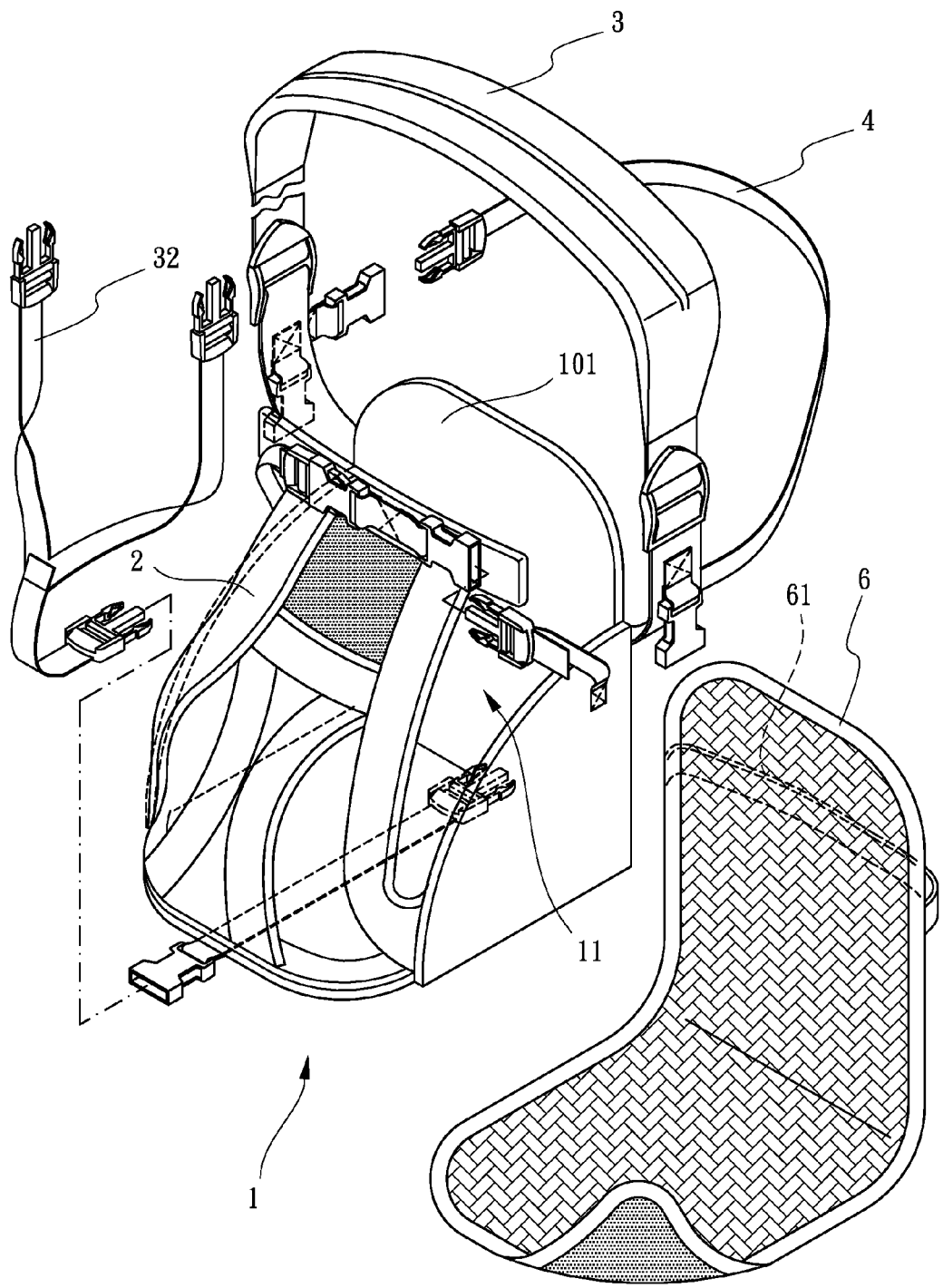
FIG. 5 is an exploded view of the multi-purpose seat for a child with a seat cushion of the present invention.
Figure 6:
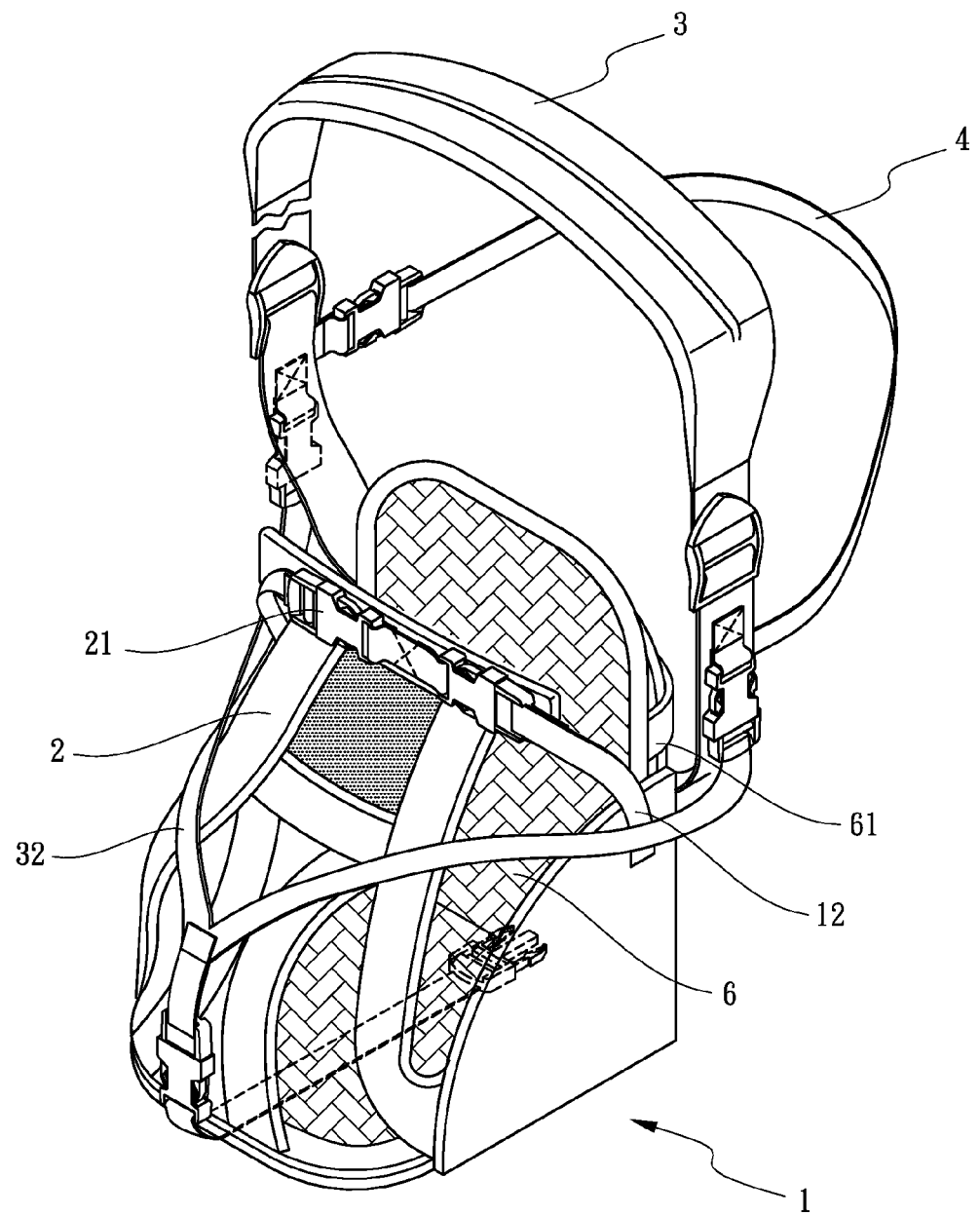
FIG. 6 is a perspective view for showing the multi-purpose seat for a child is connected with the seat cushion.

3. A seat cushion 6 is sleeved onto the seat body 1 and is located in the seat area 11. The seat cushion 6 has a position strap 61 assembled on two ends of the seat cushion 6. The position strap 61 of the seat cushion 6 is encircled an upper portion of the seat body 1 as shown in FIGS. 5-6.

4. The seat body 1 has a back panel 101, a seat panel 102 and two side panels 103. The seat panel 102 is connected with a bottom end of the back panel 101. The two side panels 103 are located on two sides of the seat body 1 respectively and are connected with the back panel 101 and the seat panel 102. The two upper straps 12 are mounted on the two side panels 103 respectively. The two ends of the shoulder strap 3 are assembled on the rear side of the back panel 101 respectively.

Although the invention has been explained in relation to its preferred embodiment, it is to be understood that many other possible modifications and variations can be made without departing from the spirit and scope of the invention as hereinafter claimed.

What is claimed is:

1. A multi-purpose seat for a child, comprising:
    a seat body, a protecting sheet, a shoulder strap and an encircle belt;
    the seat body having a seating area defined therein, the seat body having two upper straps respectively defined on two sides of the seat body;
    one end of the protecting sheet assembled to a lower portion of the seating area, the protecting sheet having two upper buckles defined at an upper portion thereof; the two upper buckles connected with the two upper straps respectively, the protecting sheet and the seat body together define two through holes therebetween for passing through two legs of a child respectively; and
    two ends of the shoulder strap assembled on a rear side of the seat body respectively, two ends of the encircle belt assembled to the two ends of the shoulder strap respectively;
    wherein a user carries the child sitting on the seat body by the shoulder strap with the encircle belt encircled the user's body; besides, when the seat body is fixed on a car seat, the encircle belt is encircled and fixed on a seat back of the car seat, so that the child sits on the seat body securely; and
    wherein the seat body has two bottom buckles defined at a bottom end thereof; a retaining belt encircles a bottom end of the car seat longitudinally; two ends of the retaining belt are buckled with the two bottom buckles respectively.

2. A multi-purpose seat for a child, comprising:
    a seat body, a protecting sheet, a shoulder strap and an encircle belt;
    the seat body having a seating area defined therein, the seat body having two upper straps respectively defined on two sides of the seat body;
    one end of the protecting sheet assembled to a lower portion of the seating area, the protecting sheet having two upper buckles defined at an upper portion thereof; the two upper buckles connected with the two upper straps respectively, the protecting sheet and the seat body together define two through holes therebetween for passing through two legs of a child respectively; and
    two ends of the shoulder strap assembled on a rear side of the seat body respectively, two ends of the encircle belt assembled to the two ends of the shoulder strap respectively;
    wherein a user carries the child sitting on the seat body by the shoulder strap with the encircle belt encircled the user's body; besides, when the seat body is fixed on a car seat, the encircle belt is encircled and fixed on a seat back of the car seat, so that the child sits on the seat body securely; and
    wherein the seat body has at least one bottom buckle defined at the bottom end thereof; the shoulder strap has two assisting buckles defined at two ends thereof respectively; a supporting strap which is Y-shaped has a branch portion and a lower portion; two ends of the branch portion of the supporting strap are connected to the assisting buckles; the lower portion of the supporting strap is connected to the bottom buckle for securely positioning the protecting sheet.

3. The multi-purpose seat as claimed in claim 2, wherein a seat cushion is sleeved onto the seat body and is located in the seat area; the seat cushion has a position strap assembled on two ends of the seat cushion; the position strap of the seat cushion is encircled an upper portion of the seat body.

4. The multi-purpose seat as claimed in claim 2, wherein the seat body has a back panel, a seat panel and two side panels; the seat panel is connected with a bottom end of the back panel; the two side panels are located on two sides of the seat body respectively and are connected with the back panel and the seat panel; the two upper straps are mounted on the two side panels respectively; the two ends of the shoulder strap are assembled on the rear side of the back panel respectively.

* * * * *